No. 786,008. Patented March 28, 1905.

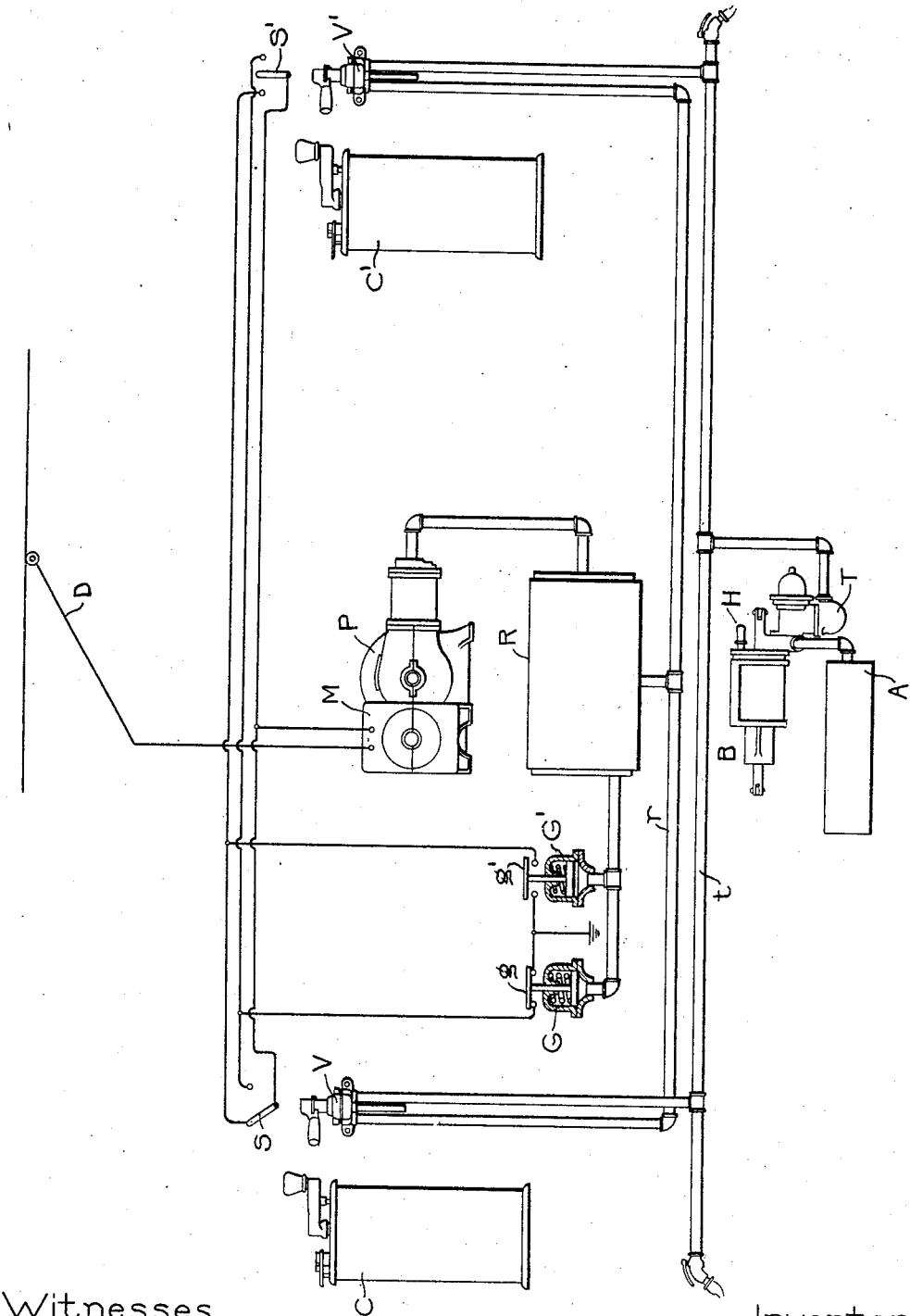

UNITED STATES PATENT OFFICE.

FRED B. COREY, OF SCHENECTADY, NEW YORK, ASSIGNOR TO GENERAL ELECTRIC COMPANY, A CORPORATION OF NEW YORK.

AIR-BRAKE CONTROL.

SPECIFICATION forming part of Letters Patent No. 786,008, dated March 28, 1905.

Application filed August 13, 1904. Serial No. 220,590.

*To all whom it may concern:*

Be it known that I, FRED B. COREY, a citizen of the United States, residing at Schenectady, in the county of Schenectady, State of New York, have invented certain new and useful Improvements in Air-Brake Control, of which the following is a specification.

My invention relates to electrically-propelled vehicles equipped with air-brake systems comprising motor-driven compressors; and its object is to provide means for enabling the motorman to control at will the pressure available for braking.

It is well known that when a train is running at high speed greater pressure may be applied to the brake-shoes without skidding the wheels than would be possible at a lower speed. Consequently it is desirable in some cases—as, for instance, interurban roads, where part of the run is made at high speeds in the country and part at much slower speeds through city streets—that the motorman should be able to vary the available braking pressure, for if the pressure is suitable for operation at the high speeds on the interurban portion of the road its use at low speeds in the city would result in skidding the wheels, while if the pressure was suitable for operation at slow speed stops could not be made as quickly and efficiently at high speed.

My invention consists in providing two governors for the motor driving the air-compressor arranged to respond to different pressures and in placing a switch where it may be conveniently manipulated by the motorman for cutting either of the governors at will into the motor-circuit. With such an arrangement the motorman may cut in the high-pressure governor, so as to have a high braking pressure available over part of the line, and cut in the other governor to reduce the braking pressure when moving on another part of the line.

My invention will best be understood by reference to the accompanying drawing, which shows diagrammatically a car equipment arranged in accordance with my invention.

M represents the electric motor driving the pump or compressor P and connected to the trolley-pole or other source of current D. The pump is connected to the usual reservoir R, which in turn is connected to the reservoir-pipe *r*.

V V' represent the usual motorman's valves connected to the reservoir-pipe *r* and the train-pipe *t*.

T, B, and A represent the usual triple valve, brake-cylinder, and auxiliary reservoir, respectively, my invention being shown as applied to what is known as the "automatic air-brake" system, although applicable to the straight air-brake system as well.

H represents the relief-valve, through which the excess pressure is gradually discharged in high-pressure braking.

C C' represent the usual controllers for the driving-motors of the vehicle, which are not shown.

G G' represent the two governors, which are set for different pressures and each of which controls a contact member $g$ or $g'$.

S S' represent switches conveniently placed for the motorman and arranged to connect either contact member into circuit with the motor M. With the switch S in the position shown the motor is connected in series with the contact member $g'$, and the motor-circuit is consequently open. The governor G' is the low-pressure governor and the governor G is the high-pressure, the former being shown with its contact member raised and the other with contact member closed. Evidently if switch S were moved to its other position, so as to connect contact member $g$ in the motor-circuit instead of contact member $g'$, the motor would start up and run until the pressure in reservoir R was raised to the proper amount to lift the high-pressure governor G. In the drawing the governors are shown in diagram merely; but it will be understood that in practice the contacts will be arranged to make and break the circuit quickly as the pressure rises and falls. A governor constructed to operate in this manner is shown in patent to S. B. Stewart, No. 671,244.

I do not desire to limit myself to the particular construction and arrangement of parts shown, but aim in the appended claims to cover all modifications which are within the scope of my invention.

What I claim as new, and desire to secure by Letters Patent of the United States, is—

1. In a vehicle, an electric motor, an air-compressor driven thereby, a plurality of governors responsive to different pressures and each adapted to control said motor, and means under the control of the motorman for cutting either of said governors into circuit with said motor.

2. In a vehicle, an electric motor, an air-compressor driven thereby, a plurality of governors responsive to different pressures and each adapted to control said motor, and a switch adjacent to the motorman's valve adapted to cut either of said governors into circuit.

3. In a vehicle, an electric motor, an air-compressor driven thereby, a plurality of governors responsive to different pressures and each provided with contacts adapted to control said motor, and a switch arranged to close the motor-circuit through the contacts of either one of said governors.

4. In a vehicle, an electric motor, an air-compressor driven thereby, a reservoir charged by said compressor, a plurality of devices connected to said reservoir and responsive to different pressures therein, switch-contacts operatively connected to said devices respectively, and a switch adjacent to the motorman's valve, adapted to cut either of said switch-contacts into the motor-circuit.

In witness whereof I have hereunto set my hand this 12th day of August, 1904.

FRED B. COREY.

Witnesses:
BENJAMIN B. HULL,
HELEN ORFORD.